(12) United States Patent
Lacaille (10) Patent No.: US 7,894,926 B2
(45) Date of Patent: Feb. 22, 2011

(54) GLOBAL PREDICTIVE MONITORING SYSTEM FOR A MANUFACTURING FACILITY

(75) Inventor: Jerome Henri Noel Lacaille, Rosny Sous Bois (FR)

(73) Assignee: PDF Solutions, Inc., San Jose, CA (US)

( * ) Notice: Subject to any disclaimer, the term of this patent is extended or adjusted under 35 U.S.C. 154(b) by 631 days.

(21) Appl. No.: 11/891,417

(22) Filed: Aug. 10, 2007

(65) Prior Publication Data

US 2008/0082197 A1 Apr. 3, 2008

Related U.S. Application Data

(60) Provisional application No. 60/846,562, filed on Sep. 22, 2006.

(51) Int. Cl.
*G06F 19/00* (2006.01)
(52) U.S. Cl. ..................... 700/121; 701/32
(58) Field of Classification Search ............. 700/121, 700/45, 49, 48, 96, 99, 103–109; 701/129, 701/32, 56; 709/202; 702/184; 714/47, 714/26
See application file for complete search history.

(56) References Cited

U.S. PATENT DOCUMENTS 5,479,340 A * 12/1995 Fox et al. ................. 700/33

| 6,678,668 | B2 * | 1/2004 | Fisher et al. ................. 706/14 |
| 7,096,074 | B2 * | 8/2006 | Yulevitch et al. ............ 700/21 |
| 7,113,838 | B2 * | 9/2006 | Funk et al. .................. 700/108 |
| 7,257,457 | B2 * | 8/2007 | Imai et al. .................. 700/121 |
| 7,474,394 | B2 * | 1/2009 | Hamamatsu et al. ..... 356/237.2 |
| 7,539,907 | B1 * | 5/2009 | Johnsen et al. ............. 714/47 |
| 7,668,702 | B2 * | 2/2010 | Kokotov et al. ............ 703/2 |

OTHER PUBLICATIONS

Gpanimatedtutorial—What is Genetic Programming? pp. 1-3, [retrieved on Aug. 1, 2007]. Retrieved from the internet: <http://www.genetic-programming.com/gpanimatedtutorial.html>.
Gpanimatedtutorial—Flowchart (Executional Steps) of Genetic Programming, pp. 1-6, [retrieved on Aug. 1, 2007]. Retrieved from the internet: <http://www.genetic-programming.com/gpflowchart.html>.

(Continued)

*Primary Examiner*—Kidest Bahta (57) ABSTRACT

A global predictive monitoring system for a manufacturing facility. The system may be employed in an integrated circuit (IC) device fabrication facility to monitor processing of semiconductor wafers. The system may include deployment of a swarm of individually separate agents running in computers in the facility. Each agent may comprise a genetic algorithm and use several neural networks for computation. Each agent may be configured to receive a limited set of inputs, such as defectivity data and WIP information, and calculate a risk from the inputs. A risk may be a value indicative of a production yield. Each agent may also generate a quality value indicative of a reliability of the risk value. New agents may be generated from the initial population of agents. Outputs from the agents may be collected and used to calculate projections indicative of a trend of the production yield.

20 Claims, 11 Drawing Sheets

OTHER PUBLICATIONS

Bootstrap, pp. 1-3, [retrieved on Aug. 2, 2007]. Retrieved from the internet: <http://www.ssc.igpp.ucla.edu/personnel/russell/ESS265/Ch9/autoreg/node6.html>.

Genetic-Programming.com-Home-Page, pp. 1-12, [retrieved on Aug. 1, 2007]. Retrieved from the internet: <http://www.genetic-programming.com/>.

Jerome Lacaille and Herve Dubus, "Defectivity Analysis By A Swarm Of Intelligent Distributed Agents", 25 sheets, Sep. 26-28, 2005, AEC/APC Indian Wells.

Jerome Lacaille, "A Mathematical Solution To Identify The Causes Of Yield Degradation", 29 sheets, Oct. 2005, ISMI—Austin.

* cited by examiner

PRIOR ART

GLOBAL PREDICTIVE MONITORING SYSTEM FOR A MANUFACTURING FACILITY

CROSS-REFERENCE TO RELATED APPLICATION

This application claims the benefit of U.S. Provisional Application No. 60/846,562, filed on Sep. 22, 2006, entitled "Agent-Based Predictive Fab Monitoring System," which is incorporated herein by reference in its entirety.

BACKGROUND OF THE INVENTION

1. Field of the Invention

The present invention relates generally to process monitoring systems and more particularly, but not exclusively, to monitoring of integrated circuit device fabrication processes.

2. Description of the Background Art

Figure 1:
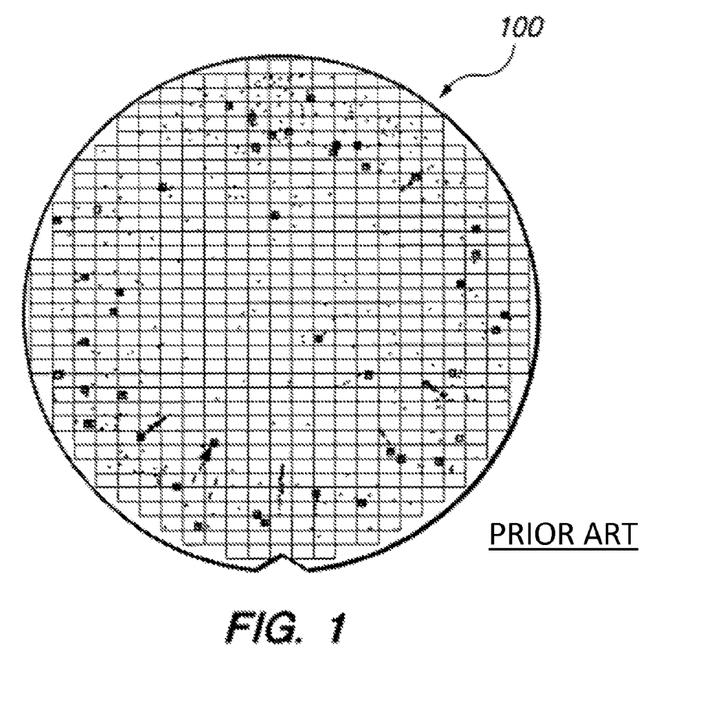
FIG. 1 shows example defectivity observations on a semiconductor wafer.

A typical integrated circuit device fabrication facility or "fab" can process semiconductor wafers at a high rate to produce various devices. It is also not uncommon for processing of a single wafer to take almost three months and for different devices to be manufactured at the same time using the same equipments. Wafers may be grouped together in lots, with each lot being carried in a pod. All wafers in a pod are typically of the same kind (e.g., same devices). Some of the lots may be inspected using specific metrology equipment to observe some wafers in the lot. The observations provide defectivity measurements. For example, 4 or 6 wafers in a lot of 25 wafers may be chosen for inspection to obtain defectivity data. Typically, only a small proportion (e.g., 20%) of the lots is selected for inspection. FIG. 1 shows example defectivity observations on a semiconductor wafer 100.

While workable, the just-described monitoring procedure allows only a very small portion of the production to be observed. Moreover, because defectivity operations do not directly relate to device production, operators are inclined to bypass them.

Defectivity metrology measures isolated defects and produces observations, such as number of defects of a minimal size, defect density, and a proportion of dies affected by the defects on the wafer area. These defects are responsible for almost 80% of the yield loss in a fabrication facility for a mature product. Embodiments of the present invention allow for global predictive monitoring of a fab or other manufacturing facility to look for trends that can negatively impact the yield.

SUMMARY

Disclosed is a global predictive monitoring system for a manufacturing facility. The system may be employed in an integrated circuit (IC) device fabrication facility to monitor processing of semiconductor wafers. The system may include deployment of a swarm of individually separate agents running in different computers in the facility. Each agent may comprise a genetic algorithm and use several neural networks for computation. Each agent may be configured to receive a limited set of inputs, such as defectivity data and wafer-in-process (WIP) information, and calculate a risk from the inputs. A risk may be a value indicative of a production yield. Each agent may also generate a quality value indicative of a reliability of the risk value. New agents may be generated from the initial population of agents. Outputs from the agents may be collected and used to calculate projections indicative of a trend of the production yield.

DETAILED DESCRIPTION

Model of a Fabrication Facility

Figure 2:
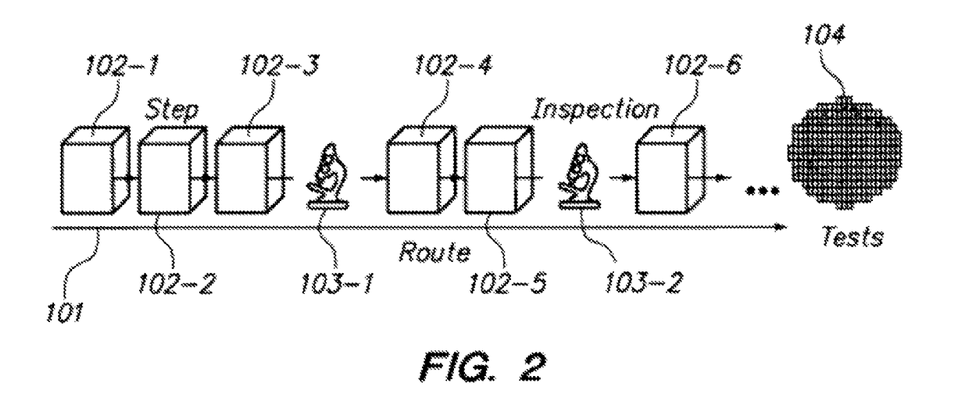
FIG. 2 illustrates inspection steps dispatched over routes of wafers in a fabrication facility.

In some IC device fabrication facilities, defectivity operation steps are performed on particular wafer processing routes but can also be moved randomly to improve metrology sampling on specific parts of the production. FIG. 2 illustrates inspection steps dispatched over an example route of wafers in the fab. In the example of FIG. 2, a wafer processing route 101 includes production steps 102 (i.e., 102-1, 102-2, . . . ), inspection steps 103 (i.e., 103-1, 103-2, . . . ), and test steps 104. The production steps 102 may comprise steps for forming structures in wafers, such as deposition, lithography, etching, diffusion, annealing, implantation, polishing, etc. steps. The inspection steps 103 involve taking measurements of the wafers and may be performed between production steps 102. The test steps 104 involve testing of the wafers and may be performed at the end of production to compute the yield.

The processing route of the lot is largely determined by the product recipe. However, for each production step, such as for each layer on the wafer, the specialized production operator is free to choose from among similar certified equipments in his or her work area. Therefore, to analyze the overall production in such fab, it is advantageous to model the random trajectories of wafer pods within the pool of available of equipments. The stochastic nature of these trajectories is the result of the availability of similar and interchangeable equipment per work area.

Figure 3:
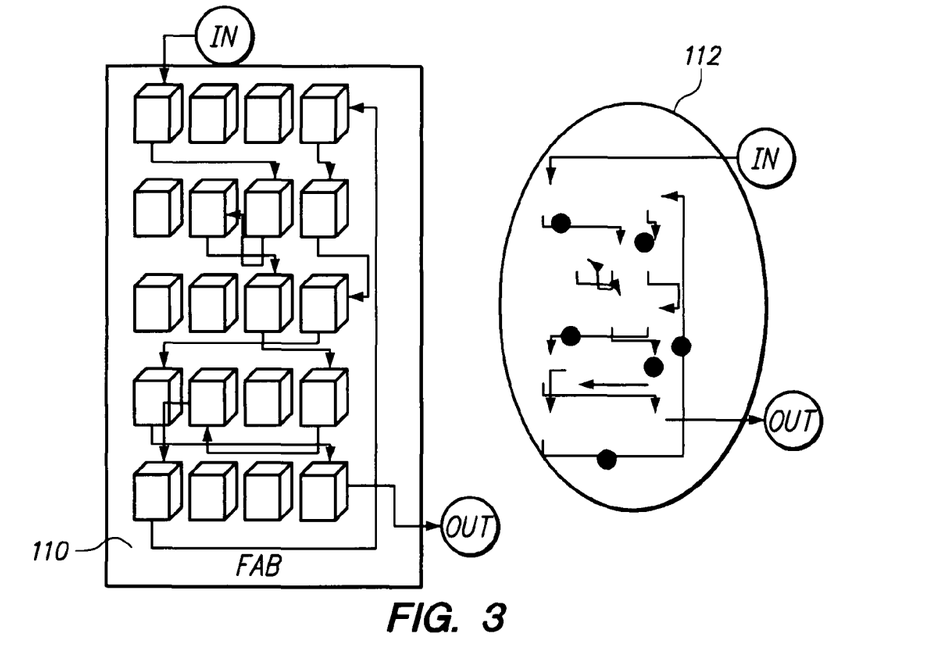
FIG. 3 schematically shows the way a monitoring system in accordance with an embodiment of the present invention sees the fabrication facility as a space of random trajectories of wafers between tools.

On the aforementioned random trajectories, defectivity steps appear like measurement points on a very complex curve. Route information can provide observations on the same curve. The trajectory model is a sparse and multivariate function of the route. Route information may be observed for each step and each wafer. Examples of route information may include date, equipment, recipe of the equipment, delay from the last step, slot position in the pod, and sometimes metrology information like defect density or defective dies. Route information is systematic while metrology is random. FIG. 3 schematically illustrates that trajectories of wafers in a fab are complex curves on which specific measurement points are set. In the example of FIG. 3, the boxes in the fabrication facility 110 represent production steps, while the arrows between production steps represent the route taken by the wafers. Boundary 112 shows the route without the production steps and the inspection steps (represented by a solid dot) along the route.

Yield

Yield may be measured at the end of production in a specific back-end area using, for example, data from electrical testing. The yield information, which comprises the results of the tests, may correspond to a proportion of surviving dies on the wafer. The joint influence of defectivity measurements on the quality of the production may be also be measured. The influence computation is the ratio of the mutual information between yield and any set of observation variables over the maximum of the entropy of the yield and the entropy of the preceding variables set penalized by a scalar coefficient λ between zero and one.

Here, Y is the yield and is a stochastic variable (monovariate), and $X=(X_1, \ldots, X_k)$ is a stochastic vector whose coordinates are input measurements on the wafer trajectories. The following equation 1 represents the influence of the set of measurements X over the yield Y:

$$R_\lambda(X, Y) = \frac{I(X, Y)}{\max[\lambda H(X), H(Y)]} \quad \text{(EQ. 1)}$$

Where $R_\lambda$ is the influence, I(X Y) is the mutual information between X and Y, H(Y) is the entropy of Y, and H(X) is the entropy of X. The coefficient k enables smoothness for the selection of the component of X. A decrease of λ implies that the entropy of X can be greater than that of the yield. Choosing λ=0.63≈log(2)/log(3) may ensure that a quantified yield in two categories (e.g., good and bad) can be modeled by a multivariate set of measurements X that can be classified in three classes (e.g., good, medium, and bad). The modeling of a doubt zone is thus possible.

Equation 2 below provides the entropy of stochastic vector X:

$$H(X) = -\int_x dP(X = x)\log P(X = x) \quad \text{(EQ. 2)}$$

where P(X=x) is the observation X has the value x. The entropy gives a description of the repartition of any stochastic vector. The entropy increases if the repartition is wide. The biggest entropy is obtained for uniform distribution when the smallest (0) is attained for constant input.

The following equation 3 indicates the mutual information between X and Y:

$$I(X, Y) = \int_{x,y} dP(X = x, Y = y)\log\frac{P(X = x, Y = y)}{P(X = x)P(Y = y)} \quad \text{(EQ. 3)}$$

The mutual information measures a stochastic distance between two groups of variables. When the two observation sets are independent, the mutual information is null and its maximum is equal to the minimal entropy of each variable. Thus, the influence ratio can be interpreted as a proportion of shared information between the two variables. Equation 4 below expresses the conventional relationship between entropy and mutual information:

$$I(X, Y) = H(Y) - H(Y | X) \quad \text{(EQ. 4)}$$
$$= H(X) - H(X | Y)$$
$$= H(X) + H(Y) - H(X, Y)$$

Figure 4:
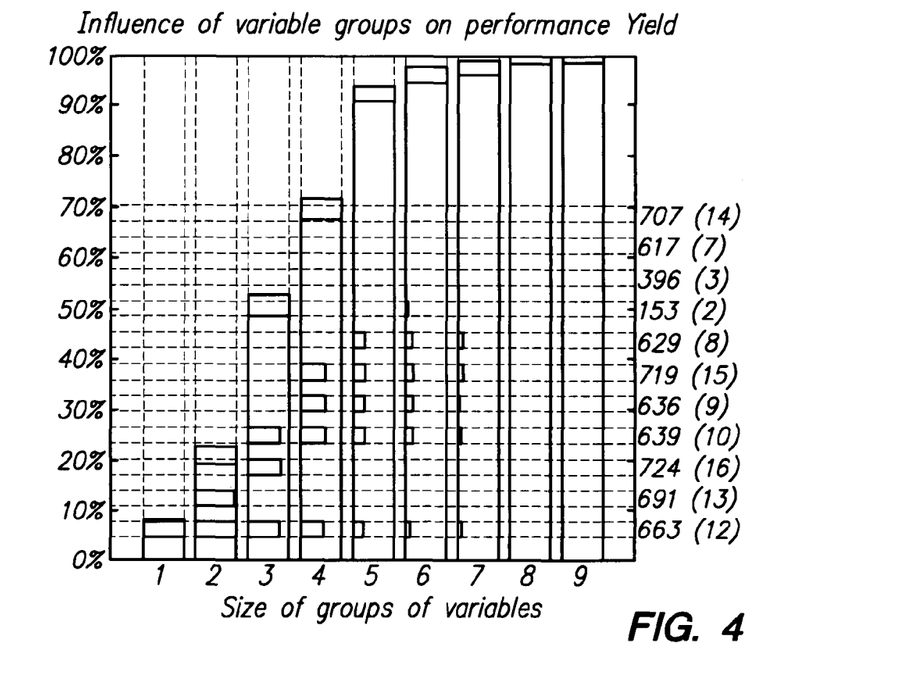
FIG. 4 illustrates the influence of stochastic vectors of defectivity measurements on yield.

An off-line study has shown that for mature products or devices, some well-selected points of measurements explain most of the performance. The result of the study was well interpreted by semiconductor specialists, as it is known that defectivity is responsible for more than 80% of the yield degradation. FIG. 4 illustrates the influence of stochastic vectors of defectivity measurements on the yield for an example three-month campaign. In the example of FIG. 4, the vertical axis represents the influence of variable groups on performance yield in percent, while the horizontal axis represents the size of groups of variables, with the variables being referenced by lines on the right axis. The numbers on the right hand size of the graph represent indexes of original variables (sorted index by a process expert in parenthesis) among a huge set of measurements taken on the trajectories of wafers and the numbers on the graph itself represents the importance of each selected variable in its group in percentage. This last value is proportional to the influence loss if one omits the corresponding variable from the group. In the experiment of FIG. 4, a group of four defectivity measurements explain 70% of the yield.

Distributed Computing Approach

In one embodiment, a global predictive monitoring system exploits a population of predictive micro-algorithms embodied in agents. These algorithms try to estimate a low-yield risk using some measurements taken on the wafer trajectories. This risk output is the probability of a low yield output. Each of the agents in the population are individually separate from one another.

An agent may be implemented by genetic programming. Each agent may be configured to use only few points of measurements, thus ensuring the robustness of its calculation. Although the small analyzes carried out independently by individual agents are not sufficient to explain the behavior of the fab, a global information with a high degree of accuracy emerges from the entire population of local predictors. For example, the outputs of the agents may be statistically analyzed together to make yield predictions.

Figure 5:
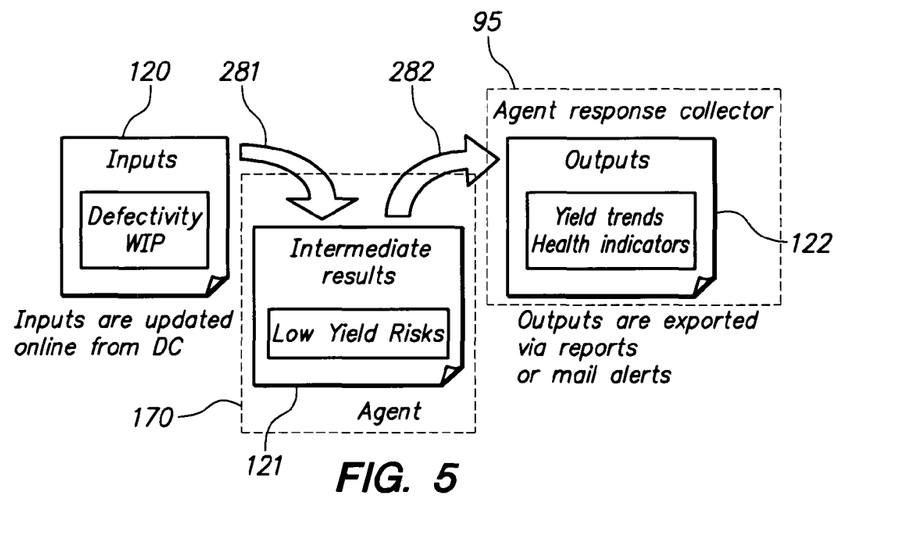
FIG. 5 schematically illustrates how a monitoring system in accordance with an embodiment of the present invention may use computations made by individual agents.

FIG. 5 schematically illustrates how a monitoring system in accordance with an embodiment of the present invention uses the individual agent's computations. In the example of FIG. 5, the inputs 120 comprise data collection (DC) from the fabrication facility. The data collection may comprise observations collected and stored by the fab, such as defectivity measurements (e.g., generated by inspection tools) of wafer in process information (e.g., taken from the manufacturing equipment system MES). The arrow 281 illustrates the action of the agents. All agents take the data collection as inputs 121 and produce intermediate results 121, which may comprise risk outputs. In the intermediate storage zone 170 now live only uniform and comparable measurements "risks" that can be analyzed by a statistical computation to generate outputs, referred to herein as projections (see arrow 282). The projections outputs 122 may be high level yield predictions and trends that can be reported to the users.

The intermediate results 121, which comprise the output or response of any agent, may comprise low yield risks assessment. Generally speaking, a "risk" is the probability of a low yield as computed by an agent for a wafer. An example of a low yield risk is the probably that a die on a wafer is bad knowing some defectivity measurement and delay between tools (i.e., production equipment). The projection outputs 122 from the agent response collector 95 may comprise yield trends, process health indicators, and so on. The agent response collector 95 may perform high level statistical analysis on the intermediate results 122 to generate the projection outputs 122. The projection outputs 122 may be exported from the agent response collector 95 using a variety of ways including by reports or email alerts.

Optimization of the Agent Population

For inputs, each agent may use some defectivity measurements taken during the route of the pods and/or WIP-information, such as equipment ID, receipt, inter-operation delays, etc. The largest agent in one embodiment uses a maximum of 6 entries for inputs, for example. The very large number of available measurements implies the existence of a lot of possible combinations of small number of measurements. It is therefore advantageous to use a population of agents distributed on a network of computers. This population may evolve every day in accordance with a genetic algorithm as a mechanism for optimizing the agent population.

Figure 6:
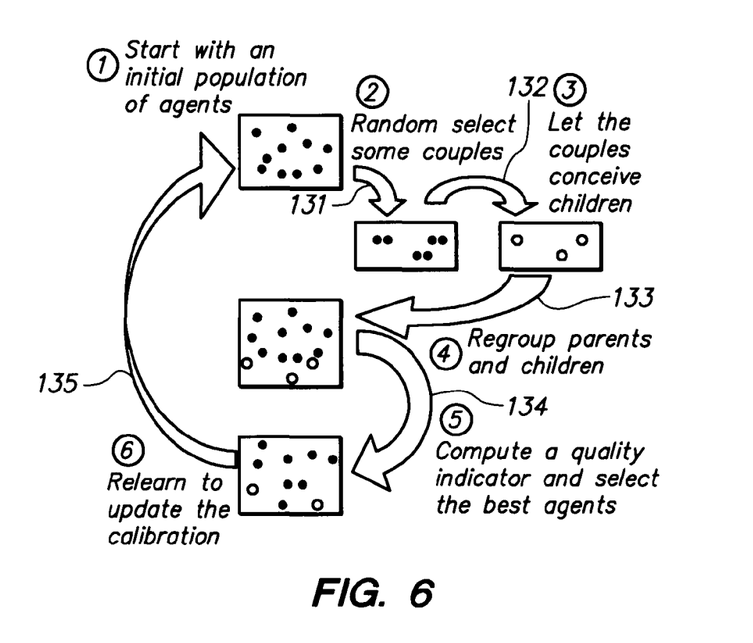
FIG. 6 schematically illustrates a flow diagram of a genetic algorithm that may be used in embodiments of the present invention.

FIG. 6 shows a flow diagram of a genetic algorithm that may be used in embodiments of the present invention. In the example of FIG. 6, each dot represents an agent. The genetic algorithm begins with an initial population of agents. Pair of agents, referred to as "couples," are randomly selected from the initial population (arrow 131). Child agents are generated from couples (arrow 132). The children and the couples are then regrouped together (arrow 133). Agents having the best qualities are selected from the enlarged population of couples and children (arrow 134). The quality may be a value indicative of a reliability of a risk generated by an agent. Relearning is subsequently performed to update the agent calibration (arrow 135).

The agents may communicate with one another and exchange information on the relevance of each one of their inputs. Agent inputs may be exchanged when agents meet together. The whole population moves over the fab and can be thought of as a swarm. The population of agents may evolve gradually to generate an increasingly relevant response, while leaving the system able to integrate some new characteristics of the fab's production process each day.

Auto-Adaptive Algorithm

Figure 7:
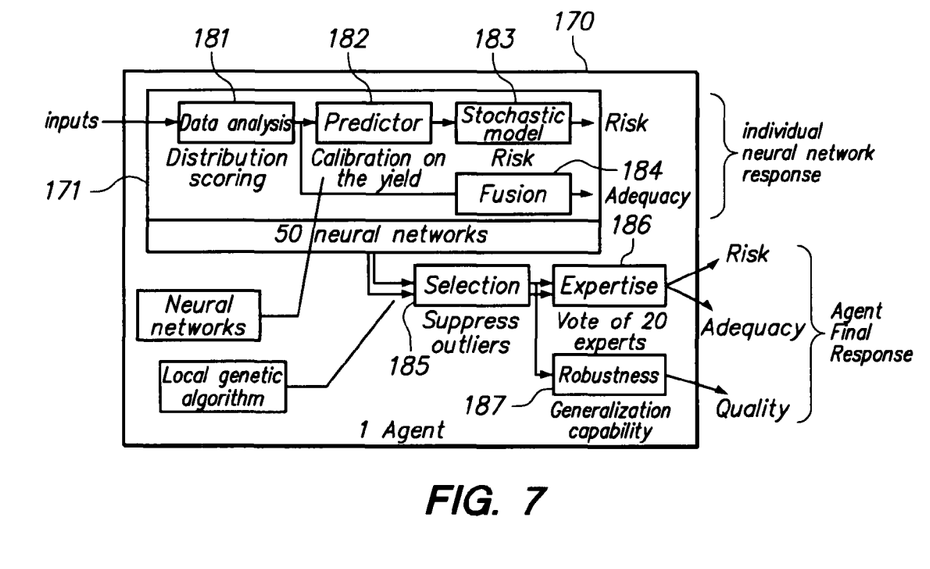
FIG. 7 schematically shows an agent in accordance with an embodiment of the present invention.

FIG. 7 schematically shows an agent 170 in accordance with an embodiment of the present invention. The agent 170 may comprise a plurality of neural networks 171 that are regularly calibrated in real time. In the example of FIG. 7, the agent 170 comprises fifty neural networks 171 but only one is shown for clarity of illustration. Each agent 170 may comprise a self-adapting algorithmic component.

A neural network 171 may perform data analysis on the agent inputs, such as by scoring the distribution of the inputs (block 181). The inputs may comprise equipment ID, recipe, delay between tools, health indicators (e.g., fault detection criteria), test chip metrology, etc.

The neural network 171 may model the distribution of the yield for the wafers that have gone through inspections at process points defined by the agent inputs (block 183). The neural network 171 may calibrate its predictive function, the relation between the distribution of the agent inputs and that of the observed yield (block 182) using yield obtained by, for example, electrical testing performed at the end of the fabrication process. The model, which uses a stochastic neural network model in this embodiment, may calculate a low yield score or yield loss probability also referred to herein as a "risk." The neural network 171 may also be configured to generate an adequacy measurement that estimates the quality of the prediction on a new wafer (block 184). The adequacy measurement may be computed as the likelihood of the new wafer trajectory knowing only the trajectories of wafers used for calibration.

A local genetic algorithm may be used to select the best neural networks 171 (block 185). For example, the local genetic algorithm may suppress neural network 171 having responses that are outliers. The final response or output of the agent 170 may be given by a vote of each one of its expert neural-networks selected by the local genetic algorithm (see block 186).

The agent 170 may further generate a quality index during its learning phase (block 187). The quality index may comprise an efficiency indicator (that use the quality and adequacy computations) weighted by a robustness level computed using a bootstrap algorithm, for example. The monitoring system's genetic algorithm may use this quality index to select the best agents 170 from a given population.

The inputs to an agent may be product-specific. Although some agents may work with all kind of products, the majority of agents are specialized. A non-supervised classification algorithm may automatically select the set of products adapted for a given agent. The genetic algorithm optimizes the quality (that is the robustness and efficiency) of the agent population but it has to respect hard constraints to ensure a homogeneous repartition of the agents over the whole fab.

Figure 8:
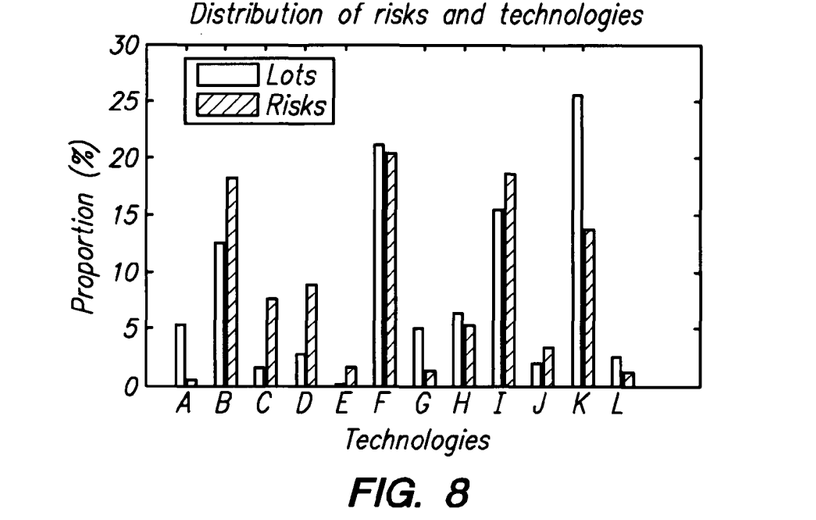
FIG. 8 shows plots illustrating how a constraint can force a population of agents to be dispatched with a similar distribution through various technologies of the production.

FIG. 8 shows plots illustrating how a constraint can force a population of agents to be dispatched with a similar distribution through various technologies of the production. In the example of FIG. 8, the vertical axis represents proportion of wafer production in percent and the horizontal axis represents wafer processing technologies. The darkly shaded plots represent lots of wafers and the lightly shaded plots represent calculated risks. As soon as the agents are operating on their own, they make assertions on the environment where they evolve. A first constraint set on the agents was to ask for homogeneous repartition of the risk computations on the production. If no such constraint was set, the agents would converge to a state that will only predict yield for the easier product to manufacture. FIG. 8 shows that when applied, this constraint for the repartition of the risks (light bars) is similar to the repartition of the lot (dark bars). Moreover, because the system is adaptive, if the lot repartition evolves so will the risk computation.

High Level Statistic Outputs

A homogeneous population of agents each outputting the same type of information replaces the complexity of the trajectories of the pods of wafers. The outputs of each agent may comprise a risk of "low yield" (i.e., risk) for each wafer, a measurement of reliability (i.e., quality) computed once during the learning phase, and a measurement of adequacy to the training context (i.e., adequacy) for each wafer.

Figure 9:
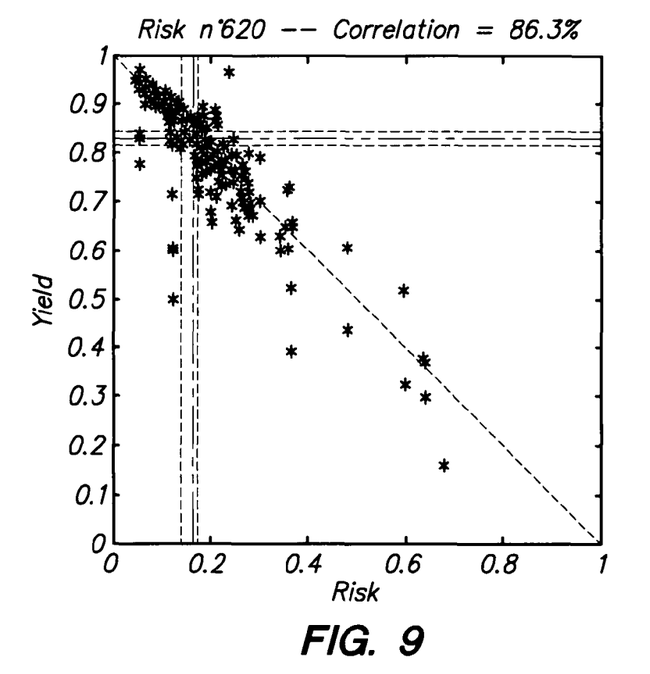
FIG. 9 shows an example agent output after conversion to graphics in accordance with an embodiment of the present invention.

FIG. 9 shows an example agent output after conversion to graphics in accordance with an embodiment of the present invention. In the example of FIG. 9, the horizontal axis represents risk level while the vertical axis represents yield level for tested wafers. The medium gray stars represent computation results with an adequacy greater than 66%, light gray stars correspond to an adequacy between 33 and 66%, and the dark stars correspond to adequacy lower than 33%. The quality of this particular agent is given in the title caption and is expressed on FIG. 9 as a correlation of 86.3% with the observed yield during calibration.

High level statistical analysis may be performed on the agent outputs to calculate yield trends. Examples of high level statistical analysis that may be performed include means and variations conditional to some constraint, such as device type (prediction of a device specific yield) or operations range in the facility (search where problem arise on the route of wafers) or event a specific tool (build tool health indicators), etc. It also includes linear models for yield trend estimation and any hypothesis testing for threshold crossing (for example, test if the probability that the yield may become lower than 90% in three days is greater than 95%).

Figure 10:
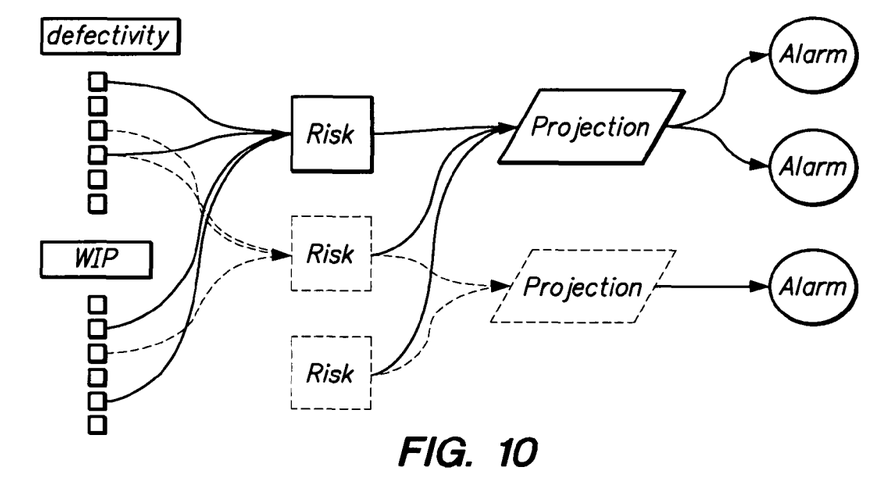
FIG. 10 shows a flow diagram illustrating the organization of statistical computations from agent outputs in accordance with an embodiment of the present invention.

FIG. 10 shows a flow diagram illustrating the organization of statistical computations from agent outputs in accordance with an embodiment of the present invention. As previously mentioned, risk values may comprise intermediate results which themselves may be used in high-level statistic computations, which are referred to as "projections". In the example of FIG. 10, a swarm of agents receives inputs at different points on wafer trajectories in the fab. The inputs may comprise defectivity data and WIP information. The agents calculate risks from the inputs. The risks are then collected by an agent response collector to calculate projections, which are then exported as alarms.

The monitoring system can thus include dashboards measuring the health of the equipments of work-area, anticipating the quality of production (of the products, devices or technologies) and locating the stages of equipments responsible for crisis and deterioration of the quality.

Figure 11:
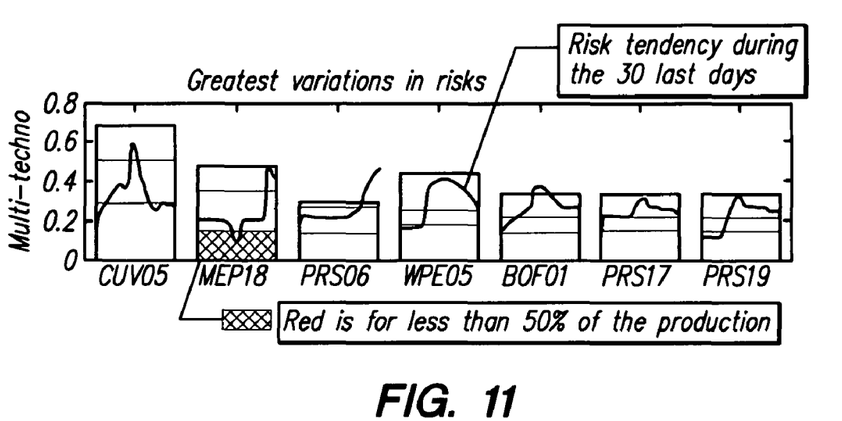
FIG. 11 shows an example dashboard display in accordance with an embodiment of the present invention.

FIG. 11 shows an example of a dashboard display in accordance with an embodiment of the present invention, where the vertical axis represents the probability of low yield (i.e., risk) and the horizontal axis represents particular equipments (i.e., tools). In the example of FIG. 11, curves representing risk tendencies at different equipment stages are shown in boxes and the box colors can warn about computation precision. For instance, the second box from the left will be in red color (poor precision) while the other will be green. All equipments of the fab can be sorted by decreasing risks or decreasing risk variations. The graph can also be filtered by work-areas or technologies.

Figure 12:
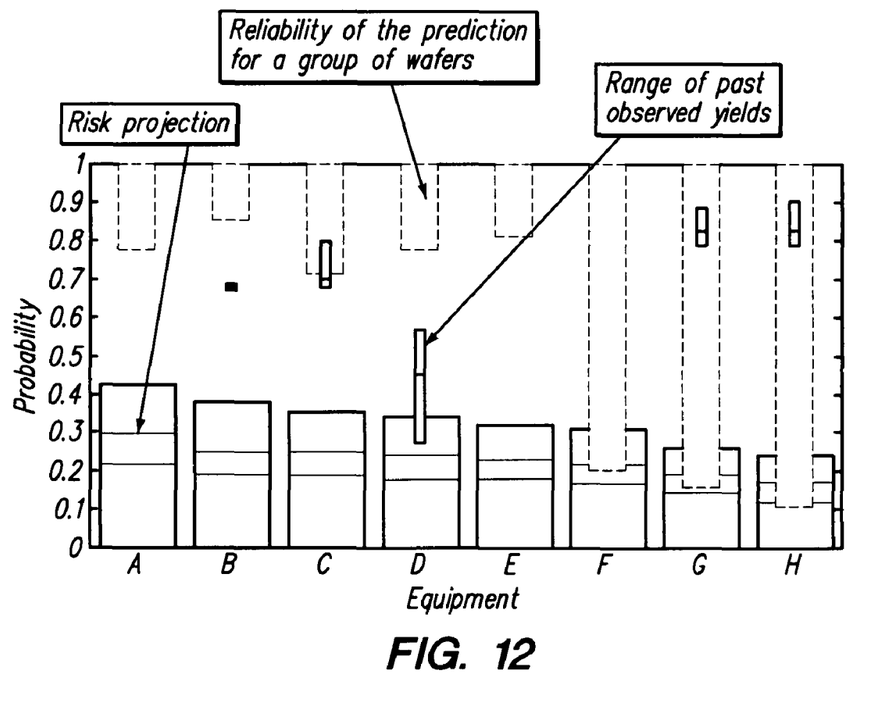
FIG. 12 shows a bar-chart showing risk projection and reliability value for risk the projection for several pieces of production equipment, in accordance with an embodiment of the present invention.

The monitoring system may also be configured to output bar-charts, such as shown in FIG. 12. In the example of FIG. 12, the vertical axis represents the probability of low yield, while the horizontal axis represents the equipment used. The bar chart of FIG. 12 show high-level and detailed risk analysis of the equipments in a work-area based on responses collected from the agents. This provides an immediate snapshot of the efficiency of each tool.

Figure 13A:
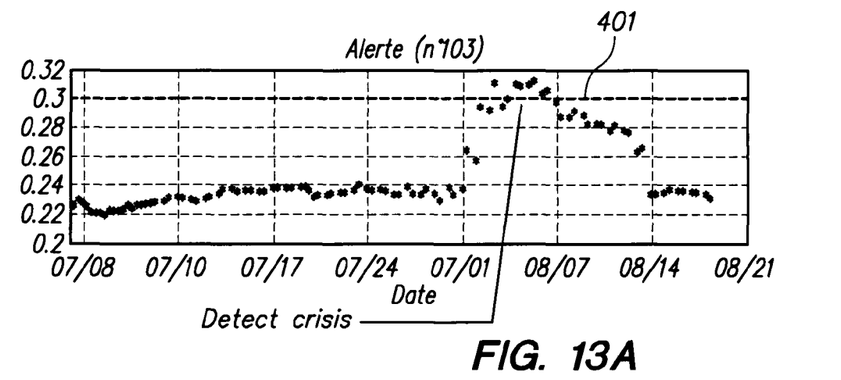
FIGS. 13A and 13B illustrate real time equipment monitoring in accordance with an embodiment of the present invention.
Figure 13B:
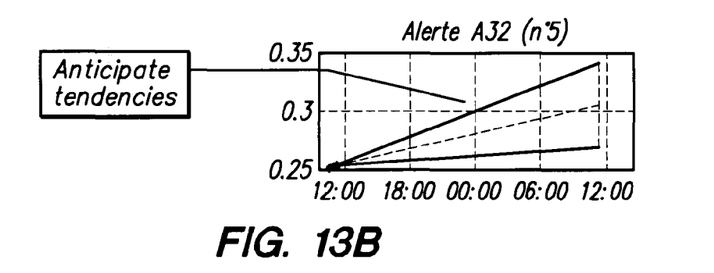

The follow-up of the projections, i.e. fusions of risks under a given context like an equipment type or an operation type, allows building up an alert system that automatically distributes alarms to operators or engineers concerned. FIGS. 13A and 13B illustrate real-time monitoring for a given equipment, where a threshold-based alert is automatically generated and provided to an operator. In the example of FIGS. 13A and 13B, the vertical axis represents risk for a particular equipment, while the horizontal axis represents the date the corresponding risk was calculated. FIG. 13A shows an example where high level statistical analysis on agent outputs allows for detection of a crisis in the production process. A line 401 indicates a threshold beyond which an alarm will be triggered. FIG. 13B shows an example where tendencies are anticipated, again by performing high level statistical analysis on agent outputs.

Automatic Inline Scheduling

A monitoring system in accordance with an embodiment of the present invention is preferably distributed over a cluster of computers. The agents are individually separate and independent from one another, and their computations can be performed in parallel.

Figure 14:
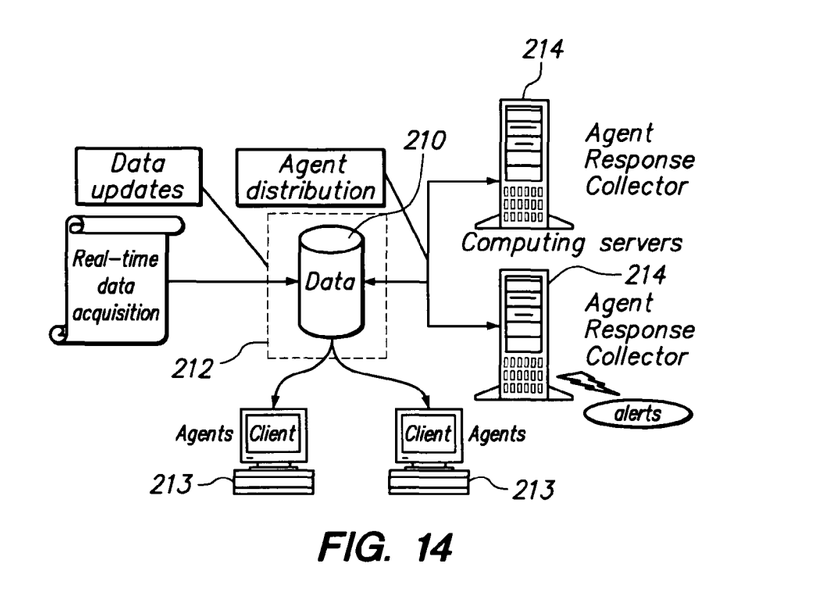
FIG. 14 schematically illustrates a global predictive manufacturing facility monitoring system in accordance with an embodiment of the present invention.

FIG. 14 schematically illustrates a global predictive manufacturing facility monitoring system in accordance with an embodiment of the present invention. In the example of FIG. 14, a central database 210 is accessible from a central server 212. The database 210 may be updated with data from real-time data acquisition systems. Such data may include agent inputs, such as defectivity data and WIP information, as well as any other available measurements. Agents are deployed across the fab to obtain the agent inputs from the database. The agents may be running in server computers 214. Agent outputs may be stored in the database 210 for access by the computing servers 214, where agent response collectors perform high level statistical analysis on the agent outputs to generate alerts and other reporting. High level outputs (projections) are the stored again on the database 210 to be consulted by client graphic applications running on client stations 213.

Figure 15:
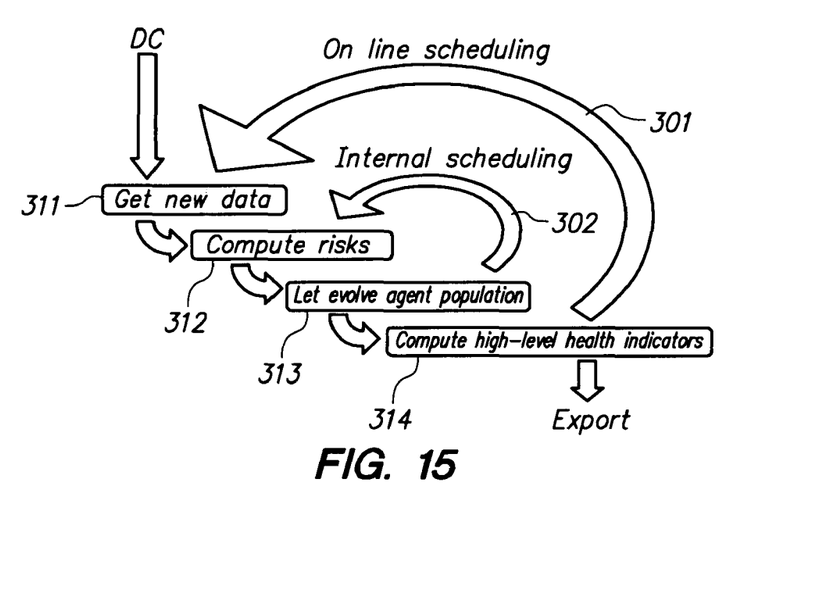
FIG. 15 illustrates computation scheduling of a monitoring system in accordance with an embodiment of the present invention.

FIG. 15 illustrates computation scheduling of a monitoring system in accordance with an embodiment of the present invention. In one embodiment, the computation scheduling is based on two cycles. The first cycle comprises an online scheduling based on the acquisition of new measurements (path 301). New data are automatically pushed to the system (for example by an ftp channel) and a loader program automatically detects the arrival of new information. The second cycle is an internal scheduling cycle driven by the genetic algorithm and the maturity of the agent population (path 302). Such cycling approach ensures that the population of agents keeps their optimal maturity when the production evolves.

In the example of FIG. 15, the agents get new input data (block 311), which the agents use to compute risks (block 312). The agent population evolves per the genetic algorithm (block 313). Statistical analysis is performed on the agent outputs to compute yield trends, such as high level health indicators (block 314). The results of the statistical analysis may be exported to other systems for reporting purposes.

Agents

Generally speaking, an agent is a regression method that takes inputs (e.g., defectivity measurements, tool identification, and delay between tools) related to wafers from anywhere in the fab and computes a prediction of the yield. In one embodiment, an agent comprises computer-readable program code (i.e., software) implemented using genetic programming. An agent my be loaded into main memory of a computer and executed by the computer's processor.

An agent may include a learning phase where the agent undergoes a calibration procedure. Knowing its inputs, the agent recovers information from all past adequate (i.e., good) wafers. For each wafer, it gets some continuous observations and some categorical data. The learning phase may involve the following steps:
  (a) A first classification algorithm using nearest neighbor methods and supervised by the yield defines classes associated to specific yield levels. The categorical variables are replaced by probability to belong to any yield level. As much percentiles are computed that there exists categorical input.
  (b) Once percentiles replace categorical variables, only continuous inputs remains. Then a regression method is used to predict the yield. This method can use a classical linear algorithm as any other high level solution like support vector machine (SVM) or multilayer neural-networks. The best method is selected automatically according to the resulted robustness.
  (c) An adjusted $R^2$ based supervision is done to select only the smallest number of inputs that are necessary to obtain a good robustness level. A classical bootstrap algorithm may be used to compute the robustness (number of try is a parameter).
  (d) The result for each product appearing in the training set of wafers is then tested. A statistic test to verify the membership of a product to a set of well-predicted products is done and outliers are deleted from the training set. At the end, the calibration is redone with the reduced set of wafers.

(The following steps follow step (e) immediately above and involve execution and outputs.)
  (e) The risk output is equal to one minus the prediction of the yield.
  (f) The quality of the agent is the mean adjusted $R^2$ computed by a bootstrap algorithm.
  (g) The adequacy of a new wafer that says that a new observation is predictable by the agent is a score based on the distance to the training set of wafers. This last score may be computed, for example, according to the teachings of U.S. Pat. No. 6,594,618 B1 (Robert Azencott, Miriad Technology, Jul. 15, 2003).

Population of Agents

The monitoring system of the present invention may use a wide population of agents spread over the fab. A first set of agents is initially defined. Then, an evolution algorithm takes charge of the distribution of the agents in the best positions in the fab. Some hard physical constraints may be used to ensure that the agents are positioned at good places in the fab.

Initialization of the Population

What differs between two agents basically is the selection of their inputs. Each input may be defined by two characteristics: the level in the route of the wafer (i.e. the step of the process) and the measurement which is taken at this level. To any level corresponds a type of process or metrology tool and this tool offers specific measurements that are registered in the database.

The first population of agents in the monitoring system may perform the following steps:
  (a) Take every one-input agent at any defectivity layer for measurement of defect density or defective dies.
  (b) Then take any two-input agents with defect density or defective dies measurements taken from any successive metrology tool.
  (c) Finally take any three-input agents with defect density or defective dies taken from successive metrology tools.

In one embodiment, defectivity measurements are used only at the beginning because the scope of the algorithm in the embodiment was to find correlation between defectivity and yield. The defect density may be replaced other kinds of defectivity measurement, such as scribe information, but one can also directly focus on some other outputs with more relevant data (for example MES data seeking for a dynamic golden route). Some agents will not survive the first learning phase because the inputs cannot be predictive anyway and also because the system only keeps a limited number of agents, and particularly those having the best quality value.

Evolution of the Population of Agents

A genetic algorithm makes the population evolve. There are different possibilities to increase the population. A new set of agents is created at each step of the evolution process, with the size of each set being a parameter of the system. Evolution of the population of agents may involve the following steps:
  (a) Random creation of a new agent: by picking randomly chosen inputs. Test if there are wafers corresponding to those inputs. If any wafers are compatible with the new set of inputs then an agent is created.
  (b) Mutation of any existing agent: replace one of the inputs by another that is randomly chosen.
  (c) Crossing of two agents, i.e. randomly selecting a pair of agents and picking inputs from the first and inputs from the second to make a new agent.

The new population of agents, which comprises the newly created and pre-existing agents, is then sorted according to the agent qualities and according to given hard constraints. From there, the monitoring system only keeps the best agents, preferably in such manner as to always keep the same number of active agents in the whole population (this number being a parameter).

The quality values of the agents may be weighted by given hard constraints linked to the fab architecture. Typical constraints are as follows:

Constraint 1: Distribution Throughout the fab

The first constraint is to have a relatively similar number of agents at each point of the route of a product. The quality of each agent is then weighed by a factor which is inversely proportional to the agent position in the route at the last measurement. For example, assuming that there are 50 production steps before the last input of agent 1 and 200 production steps before last input of agent 2, then the quality of agent 2 will be weighted by a value proportional to $1/200$, while the quality of agent 1 will be weighed by a value proportional to $1/50$.

Constraint 2: Distribution Throughout the Production

The second constraint ensures that there is an equivalent distribution of agents usable for a given product as the distribution of the current production. From there, a second weight is applied to the quality of each agent according to the following steps, for example:

(a) For each product, compute the difference between the proportion of wafers of that specific product and the proportion of agents usable for that same product.
(b) Subtract the minimum of all those numbers to obtain only positive values.
(c) Then divide each number by the sum of all results.

Fab-Wide Monitoring

The monitoring system of the present invention allows for global or fab-wide observation of the production process. The cross-analysis of risk information for each route-step (layer) and each device (or product) gives a map of the fab in terms of production quality and metrology sampling efficiency.

Figure 16:
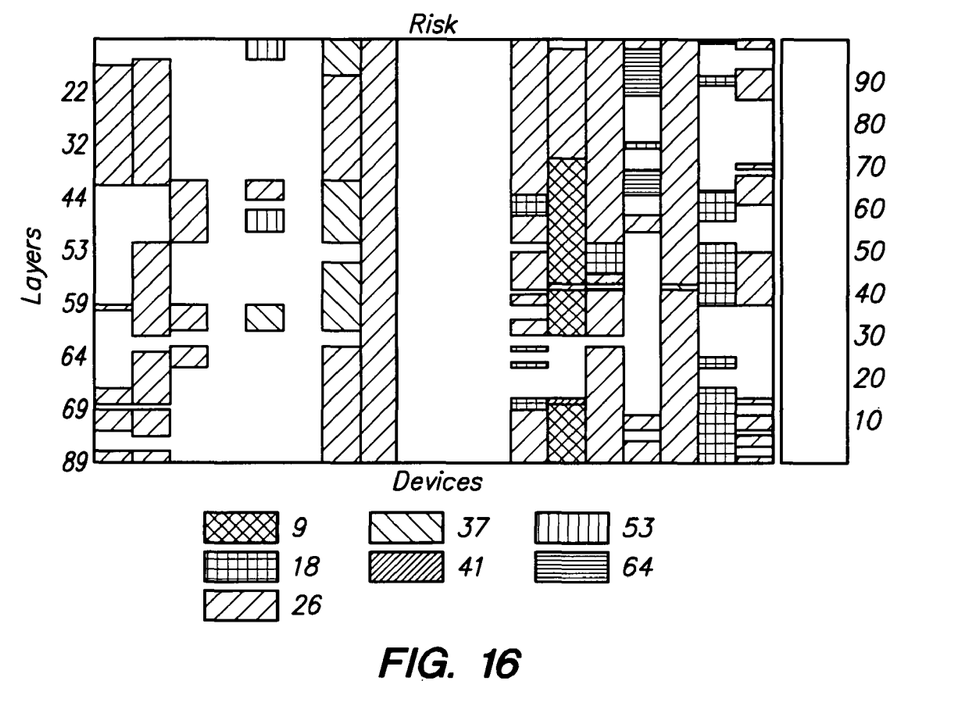
FIGS. 16 and 17 show global representations of risk measurement and risk measurement quality, respectively, in accordance with an embodiment of the present invention.

FIG. 16 provides an example of such a fab-wide representation, including an observation of the risk on the route of each device. In the example of FIG. 16, the devices may be displayed on the horizontal axis and the route (layers or operation steps) are on the vertical axis. Blue zones (bottom of the scale) represent low risk while red zones (top of the scale) focus on local problems. Note that a color representation improves visibility during operation. The example of FIG. 16 is readable in B&W (black and white) because there is no result over 65% of risk, accordingly the dark zones represent low risk and bright zones represent medium risk.

Figure 17:
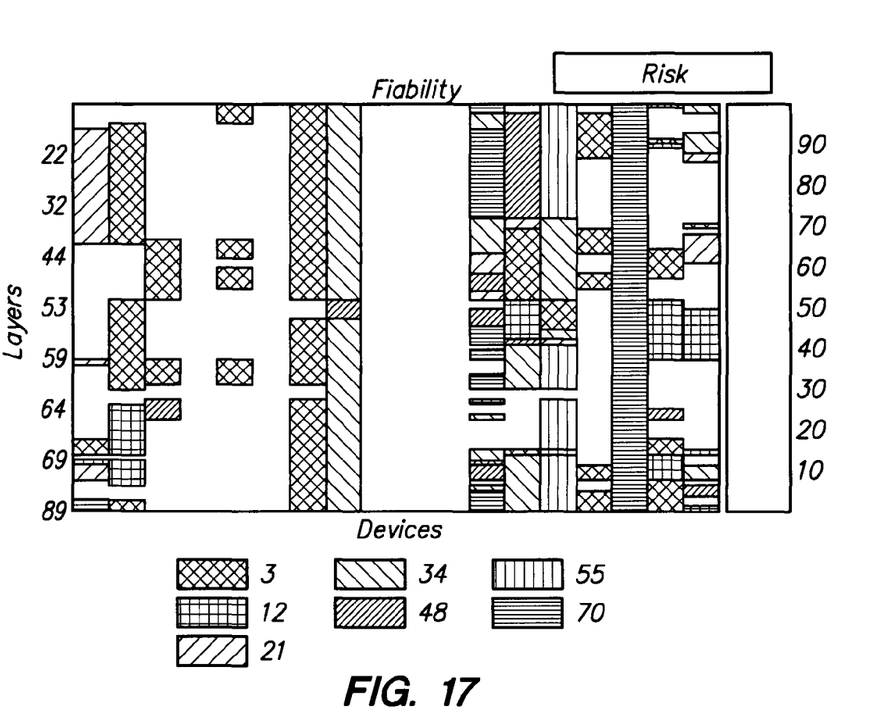

Similarly, FIG. 17 also provides a global representation of the efficiency of the sampling (distribution of defectivity measurements). The axes of FIGS. 16 and 17 are the same but the different zones now represent the quality of the computation. Green zones (high of the scale—bright in B&W) represent normal readings while red zones (bottom of the scale—dark in B&W) reveal metrology sampling inefficiency (which may eventually be solved by moving inspection steps or adding new ones).

Validation Procedures

The monitoring system of the present invention was tested and validated in an experimental setup for an extended period of time and has been progressively improved with adjunction of new types of inputs.

Validation with Tool Monitoring

Tool Monitoring is known as being a test of a specific tool using a set of clean wafers. Tool monitoring operations are done every day and are very expensive. In general, a different clean wafer is used for each chamber of the tool. As the experimental setup does not differentiate between chambers, it cannot give a more accurate precision than tool-fault.

Figure 18:
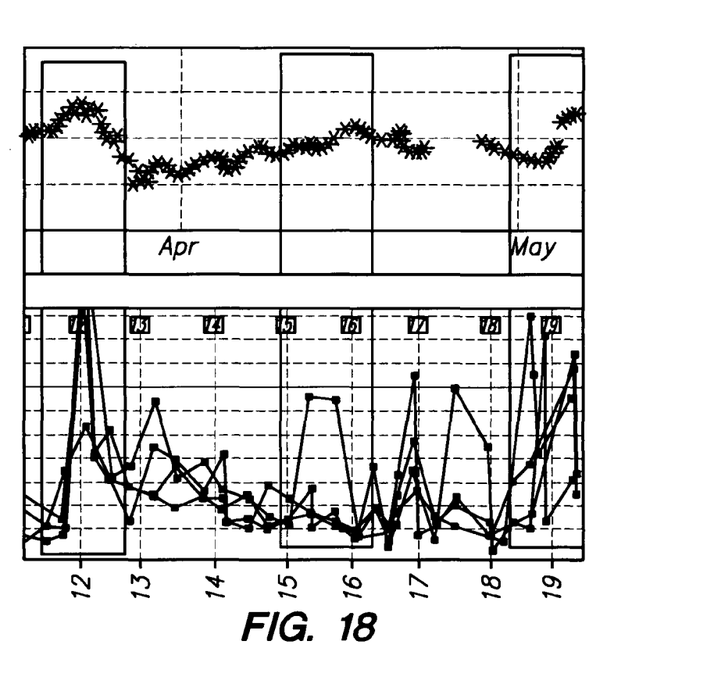
FIGS. 18 and 19 are dual diagrams illustrating validation of a monitoring system in accordance with an embodiment of the present invention based on tool monitoring and equipment alarms, respectively.

One of the validation method used in the experimental setup was the correlation with tools monitoring. FIG. 18 shows example tool monitoring data in accordance with an embodiment of the present invention. In the example of FIG. 18, the top plots shows system equipment projections computed as an expectation of risks for the specific equipment, and the bottom plots shows the corresponding monitoring information, which in this example comprises four different curves for an equipment with four chambers. Three different tools malfunction where jointly detected by tool monitoring and the experimental setup of the application as shown by the vertical gray bands. FIG. 18 is just an example of the validation test, the experimental setup was fully tested and the results show a strong correlation between tool monitoring and this tool projection (mean of tool based risk computation).

Validation with Equipment Alarms

Figure 19:
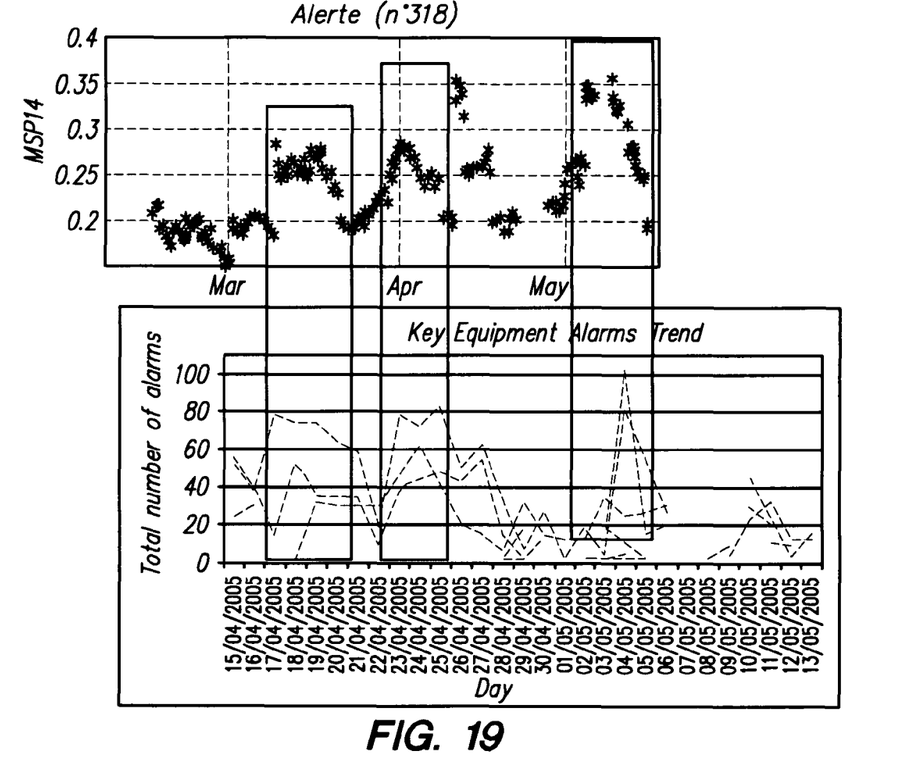

The other validation method for the experimental setup was a correlation with equipment alarms. FIG. 19 shows plots illustrating correlation between projections and equipment alarms. The top plots of FIG. 19 show projection information for the risk of equipment, while the bottom plots show alarm levels of the same equipment. Correlation between risk projections for a tool and corresponding monitoring or alarm information indicate that more than 80% of equipment alerts can be detected by the monitoring system.

Root Cause Analysis

By analyzing the agents responsible for defectivity crisis detection, the monitoring system allows for identification of faulty equipment or a more complex combination of causes. The detection is relatively straightforward if a tool is directly impacted, but can be more complicated in some cases.

Figure 20:
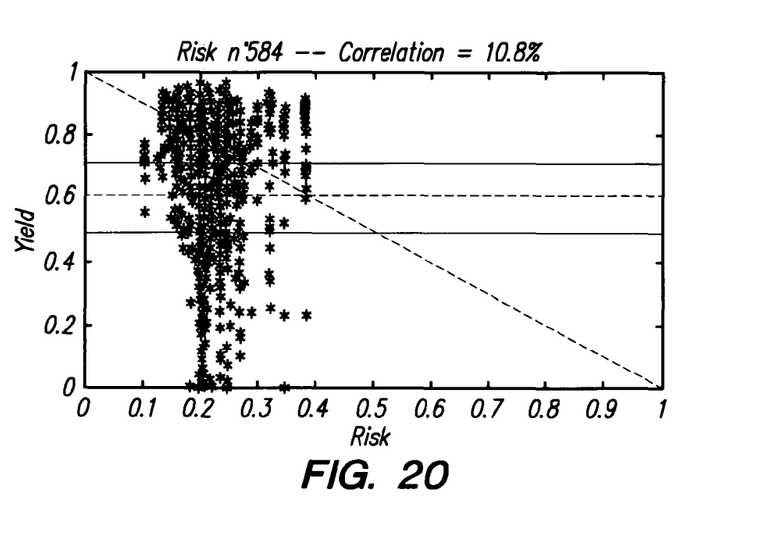
FIGS. 20 and 21 are diagrams illustrating the non-correlation and correlation, respectively, of results provided by a monovariate and a multivariate agent with a delay occurring in the production.

For example, a delay between two process steps can be very important but also very difficult to detect. FIG. 20 illustrates in graphical form the risk computation output of a monovariate agent with only the delay between process steps as an input. In the example of FIG. 20, the vertical axis represents yield and the horizontal axis represents risk. FIG. 20 illustrates that the delay parameter has no correlation with the yield.

Figure 21:
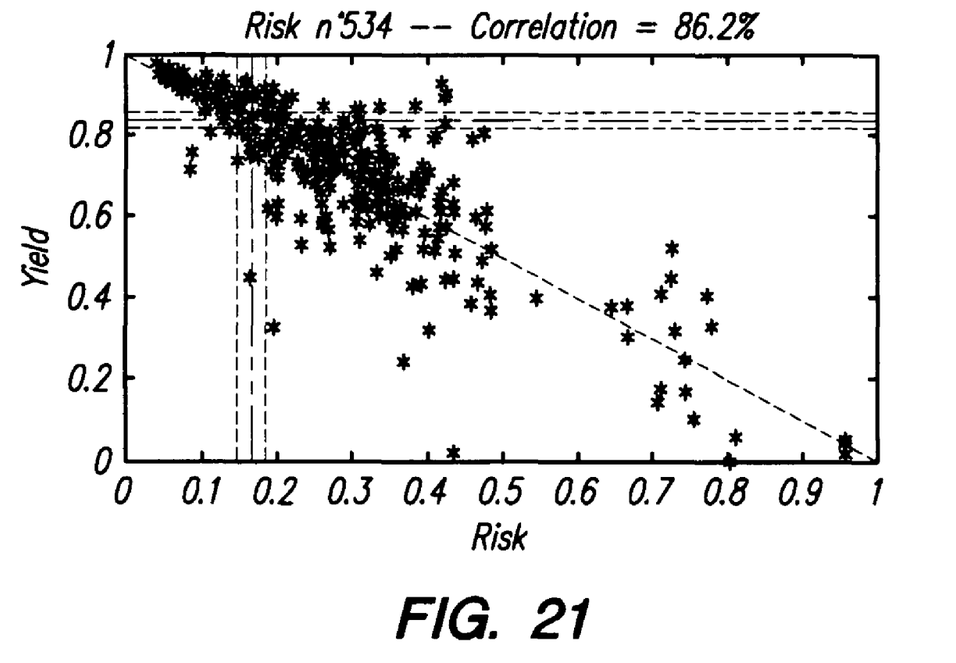

FIG. 21 illustrates in the same graphical form as FIG. 20 the risk computation outputted by a multivariate agent using as inputs the same delay plus three others inputs. FIG. 21 shows that the risk computed by the agent has a significant correlation with the yield. The other inputs alone (which in this example are defectivity, equipment ID, and clean delay) have no influence on the yield without the inter-process delay. This delay was automatically detected by the system with inline influence analysis used to select the best inputs for the agent population. This sort of result shows the great efficiency of multivariate and non-linear analysis for this kind of work. After detection of the impact of this delay, a new alarm may be hard coded in the MES system of the fab, thereby improving the production efficiency in a very simple and efficient way.

CONCLUSION

As can be appreciated from the foregoing, the monitoring system of the present invention provides a fabrication facility an overall indicator, in real time, of equipment condition. At every production shift, the whole population of risks may be computed including new data inputs, such as defect density and defective dies on a sample of production lots, and their trajectories among the process tool-set. A probability of yield loss may then be calculated for each equipment and process step.

The monitoring system is self-controlled. When the distributions of the new inputs are too different from the equivalent training data set, a new learning may be done with the latest electrical test data, for example.

The monitoring system provides a novel overall indicator, built-up on local model that is based on raw defectivity data on lots (continuous variable) and their tool-set trajectories (discrete variable). It is built-up in real time, self controlled and conditioned by yield loss prediction.

As can be appreciated from the foregoing, the global predictive monitoring system disclosed above is applicable not just to an IC device fabrication facility, but to manufacturing facilities in general.

For IC device fabrication, a great deal of information measured during a semiconductor manufacturing process has been shown to have a direct impact on the output yield. An influence analysis (measures of entropy and mutual information) measuring the stochastic dependences between the yield and automatically selected combinations of measurements proved the need to develop a monitoring system based on defectivity measurements, for example. Collecting defectivity measurements and information on the routing of the wafers in the fab allows understanding of many causes of wafer deterioration. The engineers and defectivity operators are now able to automatically generate synthesis reports to supervise the equipment health and the production quality.

The disclosed monitoring system uses mathematical algorithms to manage the complexity of the wafer movement within the fab, embodied in a population of individually separate and intelligent agents. Each of these agents exploits neuronal network technology on small packages of specific measurements. It is thus possible to model some particular modes of the fab production in a robust way. Finally these agents share their respective competences to build an effective anticipation model for the yield. The mathematical analysis used is not based on a deterministic modeling of the manufacturing process but on a stochastic approach. The suggested solution exploits the diversity of the measurements acquired in real time, and is gauged automatically. Its output is a measurement of probability: the risk to produce with low yield. The system not only measures yield risk but also the reliability of the prediction itself. In addition, it provides an adequacy indicator of the model to the data observed. The latter may be exploited automatically for the next learning phase of the agents. New types of measurements can be integrated into the system including: maintenance, equipment monitoring, wafer traceability (within each equipment chamber) and accurate real-time measurements of tool sensors during each operation.

What is claimed is:

1. A global predictive monitoring system for a manufacturing facility, the system comprising:
   a plurality of individually separate and independent agents distributed on different computers in the manufacturing facility, each of the agents being configured to (i) receive a set of inputs for calculating and outputting a risk value indicative of production yield, (ii) calculate and output a risk value indicative of production yield, and (iii) calculate and output a quality value indicative of a reliability of the calculated risk value; and
   an agent response collector configured to receive outputs of the plurality of agents to generate a projection indicative of a health of production in the manufacturing facility.

2. The system of claim 1 wherein each of the agents comprises a plurality of neural networks.

3. The system of claim 1 wherein each of the agents comprises a genetic algorithm.

4. The system of claim 1 wherein the manufacturing facility comprises an integrated circuit (IC) device fabrication facility and the plurality of agents is configured to receive defectivity data from wafers processed in the fabrication facility.

5. The system of claim 4 wherein the plurality of agents is configured to collect defectivity data from the wafers along route of the wafers in the fabrication facility.

6. The system of claim 4 wherein the plurality of agents is configured to collect information from wafers-in-process.

7. The system of claim 6 wherein the information from wafers-in-process includes equipment ID.

8. A computer-implemented method of monitoring an IC device fabrication facility, the method comprising:
   creating an initial population of agents in the fabrication facility, each of the agents being configured to (i) receive at least one input comprising data collected on a route of a wafer being processed in the fabrication facility, (ii) calculate and output a risk value indicative of production yield, and (iii) calculate and output a quality value indicative of a reliability of the calculated risk value;
   creating new agents from agents in the initial population of agents to create a new population of agents; and
   generating a projection indicative of a trend of a production yield in the fabrication facility based, at least in part, on outputs from agents in the new population of agents.

9. The method of claim 8 wherein each of the agents in the initial population of agents comprises a genetic algorithm.

10. The method of claim 8 wherein the new agents are generated using a random agent generation process.

11. The method of claim 8 wherein the new agents are generated from a pair of agents randomly selected from the initial population of agents.

12. The method of claim 8 wherein each agent comprises a plurality of neural networks.

13. The method of claim 8 wherein each agent in the initial and new population of agents is configured to collect defectivity data from wafers-in-process in the fabrication facility.

14. The method of claim 8 each agent in the initial and new populations of agents comprises at least fifty neural networks.

15. A computer-implemented method of monitoring an IC device fabrication facility, the method comprising:
   running a plurality of individually separate and independent agents in computers in the fabrication facility, each agent in the plurality of agents being configured to (i) receive a limited set of input data from a central database, (ii) calculate a first value indicative of a yield of a production process in the fabrication facility, and (iii) calculate a second value indicative of a reliability of the first value; and
   collecting outputs from the plurality of agents to generate a collected output; and
   performing statistical analysis on the collected output to determine a trend of the yield of the production process.

16. The method of claim 15 wherein each agent comprises a genetic algorithm.

17. The method of claim 15 wherein each agent comprises a plurality of neural networks.

18. The method of claim 15 further comprising:
   creating a new population of agents from the plurality of agents.

19. The method of claim 16 wherein the new population of agents is created from randomly selected pairs of agents in the plurality of agents.

20. The method of claim 15 wherein the limited set of input data includes defectivity data.

* * * * *